United States Patent
Lei et al.

(10) Patent No.: US 11,210,943 B2
(45) Date of Patent: Dec. 28, 2021

(54) EDGE COMPUTING AIDED RADIO CONGESTION MITIGATION

(71) Applicant: Ford Global Technologies, LLC, Dearborn, MI (US)

(72) Inventors: Oliver Lei, Windsor (CA); Somak Datta Gupta, Novi, MI (US); Vladyslav Slyusar, Northville, MI (US); Jayanthi Rao, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/806,186

(22) Filed: Mar. 2, 2020

(65) Prior Publication Data
US 2021/0272454 A1 Sep. 2, 2021

(51) Int. Cl.
*G08G 1/00* (2006.01)
*G08G 1/09* (2006.01)
*H04W 28/02* (2009.01)
*G08G 1/04* (2006.01)
*G08G 1/01* (2006.01)

(52) U.S. Cl.
CPC ........... *G08G 1/091* (2013.01); *G08G 1/0133* (2013.01); *G08G 1/04* (2013.01); *H04W 28/0289* (2013.01)

(58) Field of Classification Search
CPC .................................. G08G 5/00; G08G 1/09
See application file for complete search history.

(56) References Cited

U.S. PATENT DOCUMENTS

| | | | |
|---|---|---|---|
| 2019/0141573 A1 | 5/2019 | Brostrom et al. | |
| 2019/0222652 A1 | 7/2019 | Graefe et al. | |
| 2019/0253835 A1* | 8/2019 | Jones | G06F 16/951 |
| 2019/0306912 A1 | 10/2019 | Cheng et al. | |
| 2020/0242924 A1* | 7/2020 | Publicover | G08G 1/096758 |

FOREIGN PATENT DOCUMENTS

WO   WO2019104280 A1   5/2019

* cited by examiner

*Primary Examiner* — K. Wong
(74) *Attorney, Agent, or Firm* — Michael Spenner; Brooks Kushman P.C.

(57) ABSTRACT

A computing device includes a camera configured to capture images of an area of a road, the area defining a geofence; and a processor, configured to responsive to detecting a traffic density within the geofence exceeding a predefined threshold, wirelessly broadcast a directional message within the geofence to request vehicles located within the geofence to temporarily disable individual messaging services having low priorities identified in the directional message, analyze vehicle traffic using images captured by the camera to detect a predefined traffic situation, responsive to detecting the predefined traffic situation initiated by one of the vehicles, generate a safety message reflecting the traffic situation, and broadcast the safety message to vehicles within the geofence.

20 Claims, 4 Drawing Sheets

EDGE COMPUTING AIDED RADIO CONGESTION MITIGATION

TECHNICAL FIELD

The present disclosure generally relates to an edge computing system. More specifically, the present disclosure relates to an edge computing system to mitigate radio congestions for vehicle wireless communication.

BACKGROUND

Vehicles are increasingly equipped with wireless communication technologies to communicate with each other. A few examples of those wireless communication technologies include cellular vehicle to everything (CV2X) and dedicated short range communications (DSRC). However, the wireless communication has a limited bandwidth. In case of a traffic congestion, e.g. on a very busy road or intersection, the wireless channels may be congested and unable to communicate all messages from each vehicle in time due to the limited bandwidth.

SUMMARY

In one or more illustrative embodiments of the present disclosure, a computing device includes a camera configured to capture images of an area of a road, the area defining a geofence; and a processor, configured to responsive to detecting a traffic density within the geofence exceeding a predefined threshold, wirelessly broadcast a directional message within the geofence to request vehicles located within the geofence to temporarily disable individual messaging services having low priorities identified in the directional message, analyze vehicle traffic using images captured by the camera to detect a predefined traffic situation, responsive to detecting the predefined traffic situation initiated by one of the vehicles, generate a safety message reflecting the traffic situation, and broadcast the safety message to vehicles within the geofence.

In one or more illustrative embodiments of the present disclosure, a vehicle includes a wireless transceiver; and a controller configured to responsive to receiving a directional message, via the wireless transceiver, broadcasted from an edge-computing device, activate a collective messaging mode by disabling individual messaging services having predefined low priorities identified in the directional message, responsive to receiving a safety message broadcasted from the edge-computing device, perform an autonomous driving maneuver using the safety message, and responsive to detecting a restoration condition being met, deactivate the collective messaging mode by restoring the individual messaging services.

In one or more illustrative embodiments of the present disclosure, a method includes capturing, via a camera, images covering an area of a road; analyzing, via a processor, the images to evaluate a traffic density in the area; responsive to detecting the traffic density exceeding a predefined threshold, broadcasting, via a wireless transceiver, a directional message within the area to request vehicles located within the area to temporarily disable individual messaging services having low priorities identified in the directional message; responsive to detecting a predefined traffic situation initiated by one of the vehicles, generating, via the processor, a safety message reflecting the traffic situation; broadcasting, via the wireless transceiver, the safety message to vehicles within the area; and responsive to detecting the traffic density is below the predefined threshold, broadcasting an instruction message requesting the vehicles within the are to restore individual messaging services.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

Figure 1:
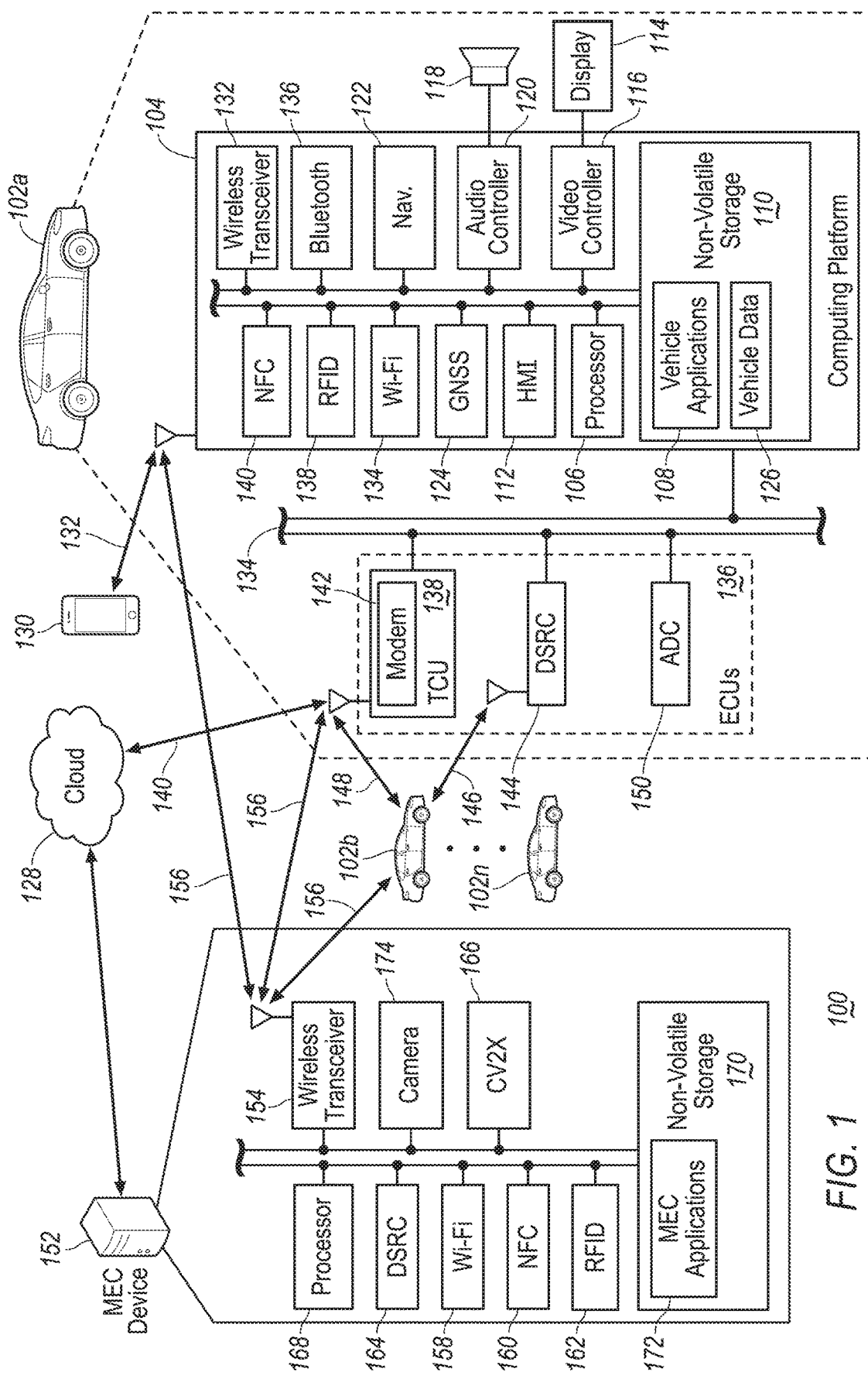
FIG. 1 illustrates an example block topology of an edge computing system of one embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a multi-access edge computing (MEC) system for road traffic. More specifically, the present disclosure proposes a MEC system for broadcasting basic safety messages (BSM) and/or other messages to local vehicles to reduce radio congestions.

Vehicles use wireless connections (e.g. CV2X connections) to send and receive messages from each other. The messages may include BSMs, vehicle service messages, emergency messages or the like. Each type of messages may be assigned with a priority. For instance, the emergency messages may be assigned with the highest priority, BSMs may be assigned with medium level priority and services messages may be assigned with low priority. With the increasing number of vehicles provided with wireless connection features on the road, the wireless connection channel may become congested. The present disclosure proposes a MEC system having a MEC device (a.k.a. MEC server) connected to a smart camera to adaptively determine vehicle density and broadcast BSMs to local vehicles instead of having each vehicle sending messages individually. The MEC device may request to disable the BSMs sent from each vehicle within a predefined geofence covered by the MEC and the smart camera.

Referring to FIG. 1, an example block topology of a vehicle system 100 of one embodiment of the present disclosure is illustrated. A vehicle 102a may include various types of automobile, crossover utility vehicle (CUV), sport utility vehicle (SUV), truck, recreational vehicle (RV), boat, plane, or other mobile machine for transporting people or goods. In many cases, the vehicle 102a may be powered by an internal combustion engine. As another possibility, the vehicle 102a may be a battery electric vehicle (BEV), or a hybrid electric vehicle (HEV) powered by both an internal combustion engine and one or move electric motors, such as a series hybrid electric vehicle (SHEV), a plug-in hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, vehicle messaging, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102a. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output and input to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102a. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as a part of the vehicle applications 108. Traffic data may be downloaded from a cloud server 128 (to be discussed in detail later).

The computing platform 104 may be configured to wirelessly communicate with various digital entities. For instance, the computing platform 104 may be configured to communicate with a mobile device 130 of the vehicle users/occupants via a wireless connection 132. The mobile device 130 may be any of various types of portable computing devices, such as cellular phones, tablet computers, wearable devices, smart watches, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver, an ultra-wide band (UWB) transceiver (not shown), and configured to communicate with a compatible wireless transceiver (not shown) of the mobile device 130.

The computing platform 104 may be further configured to communicate with various components of the vehicle 102a via one or more in-vehicle network 134. The in-vehicle network 134 may include, but is not limited to, one or more of a controller area network (CAN), an Ethernet network, and a media-oriented system transport (MOST), as some examples.

The computing platform 104 may be configured to communicate with various ECUs 136 of the vehicle 102a configured to perform various operations. For instance, the computing platform may be configured to communicate with a TCU 138 configured to control telecommunication between vehicle 102a and cloud 128 through a wireless connection 140 using a modem 142. The wireless connection 140 may be in the form of various communication network e.g. a cellular network. Through the cloud 128, the vehicle may access various content for various purposes (e.g. live traffic data for navigations). It is noted that the term cloud are used as a general term in the present disclosure and may include any computing network involving carriers, router, computers, servers, controllers or the like configured to store data and perform data processing functions and facilitate communication between various entities.

The ECUs 136 may further include a DSRC controller 144 configured to communicate with one or more fleet vehicles 102b . . . 102n via a wireless V2V or V2X connection. For instance, the DSRC controller 180 may be configured to communicate with one or more fleet vehicles 102b . . . 102n via a DSRC connection 146. The fleet vehicles 102b . . . 102n may include various vehicles associated with the same or different manufacturers and subscribed to the wireless communication feature enabled by the vehicles system of the present disclosure. Additionally or alternatively, the vehicle 102a may communicate with the fleet vehicles 102b . . . 102n via CV2X connection 148 through the TCU 138. For instance, responsive to detecting each other, the fleet vehicles 102 may establish one or more wireless connections 184 and 186 and exchange information such as BSMs. Vehicle BSMs may include various information about the vehicle including route, intent, and vehicle status. For instance, a vehicle making a left turn may generate a BSM to inform oncoming traffic about the intent to make the left turn and ask the oncoming traffic to yield as appropriate. Additionally, the BSM may also be sent to traffic trailing the turning vehicle to avoid rear ending caused by speed reduction. Responsive to receiving a BSM from a fleet vehicle 102, the vehicle 102a may output the message via the HMI controls 112 to inform the driver about the intent of source vehicle. Alternatively, in case the vehicle 102a is provided with autonomous driving features via an autonomous driving controller (ADC) 150, the ADC 150 may be configured to perform autonomous driving maneuvers using the BSM received. It is noted that the ECUs 136 introduced here are merely examples and the actual vehicle 102a may be provided with more ECUs or controllers configured to perform various operations. Each ECU 136 may be provided with processing and storage capabilities operated by computer software.

A MEC device 152 may be configured to communicate with the vehicle 102a (as well as fleet vehicles 102b . . . 102n) via a wireless transceiver 154 through one or more wireless connections 156. For instance, the wireless transceiver 154 may be in communication with a Wi-Fi controller 158, a NFC controller 160, a RFID controller 162, a DSRC controller 164 and/or a CV2X controller 166, configured to communicate with the vehicles 102 via compatible protocols. The MEC device 152 may be further provided with a processor 168 configured to perform instructions, commands, and other routines in support of the process such as wireless communication, image processing, BSM generation or the like. The MEC device 152 may be provided with a non-volatile storage 170 to store various MEC applications 172. The MEC device 152 may be further provided with a camera 174 configured to capture images and videos of a road or intersection covered by the MEC device 152. For instance, the MEC device 152 and the camera 174 may be mounted on a light pole or a traffic light to monitor a traffic situation within a predefined vicinity of an intersection. The camera 174 may be provided with smart camera features supported by MEC applications 172 configured to automatically recognize vehicles and densities of traffic. Additionally, the MEC device 152 may determine traffic conditions based on traffic images captured by the camera 174 and generate BSMs accordingly to send to vehicles 102.

Figure 2:
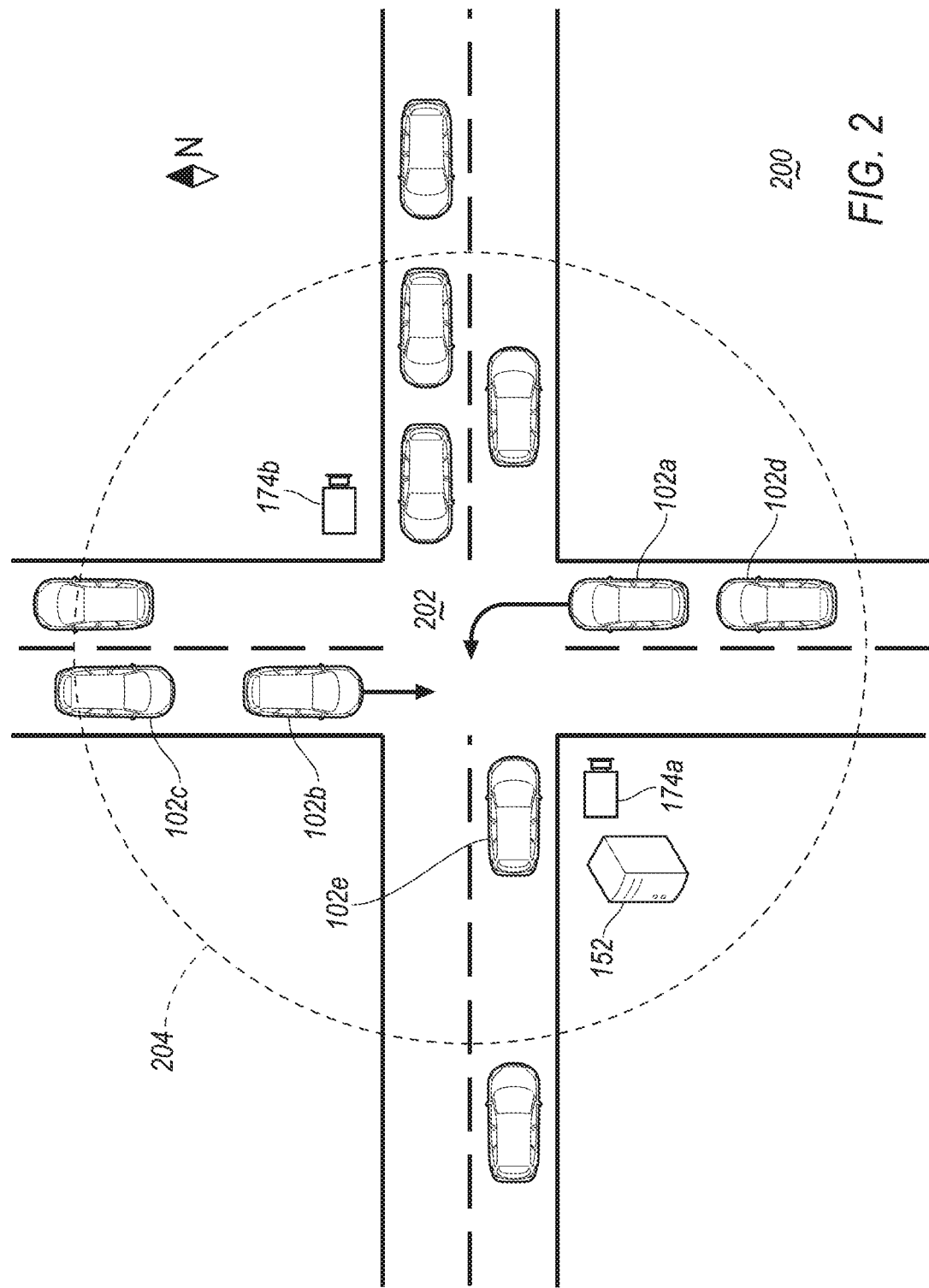
FIG. 2 illustrates an example schematic diagram of the edge computing system of one embodiment of the present disclosure.

Referring to FIG. 2, a schematic diagram 202 of the edge computing system of one embodiment of the present disclosure is illustrated. With continuing reference to FIG. 1, in the present example, the MEC device 152 is associated with two cameras 174 configured to capture images of an intersection 202 from different angles. The MEC device 152 may be mounted on a physical structure (e.g. a light pole, a traffic light or a building) near the intersection 202. A first camera 174a may be integrated with the MEC device and configured to face the direction of the intersection 202 to capture images. Depending on the specific camera setup, a single camera may have limited coverage of road traffic and create significant blind spot which is undesirable. Therefore, as illustrated in the present example with reference to FIG. 2, a second camera 174b may be set up at an opposite side of the intersection 202 to capture images from a different angle. The second camera 174b may be connected to the MEC device 152 via a cable (not shown). Additionally or alternatively, a wireless connection may be used to connect to the MEC device 152 through the wireless transceiver 154 in lieu of the cable. It is noted that although two cameras are used in the present example, the present disclosure may not be limited to such a configuration and be expanded to utilization of multiple cameras, sensors of various types to detect traffic and road conditions depending on design need.

The MEC device 152 may be configured to cover a limited area within which the MEC device 152 may generate and send messages to vehicles collectively. The area may be referred to as a geofence 204. In the present example, the geofence 204 may be defined as the area of intersection 202 and road that is practically covered by the two cameras 174. Alternatively, the geofence may be further affected by a transmission range of the wireless transceiver 154 of the MEC device 152. As illustrated in FIG. 2, the geofence 204 may cover an area having multiple vehicles. Among those vehicles in the geofence 24, some vehicles 102 are provided with the wireless communication feature (a.k.a. fleet vehicle 102) whereas the others are not provided with such a feature. Responsive to detecting a fleet vehicle 102 has entered the geofence, the MEC device 152 may instruct the fleet vehicle 102 to reduce or stop to send the BSMs and service messages. The MEC device 152 may generate and broadcast the BSMs collectively to fleet vehicles 102 within the geofence. In the present example, a first fleet vehicle 102a may intent to may a left turn in the intersection 202 which may trigger a BSM to notify nearby vehicles. The MEC device 152 may detect the intent of the intent of the first fleet vehicle 102a and generate a BSM indicative of the upcoming left turn maneuver of the first fleet vehicle 102a. The MEC device 152 may then broadcast the BSM message to fleet vehicles 102 within the geofence collectively to notify about the left turn intent of the first fleet vehicle 102a.

Figure 3:
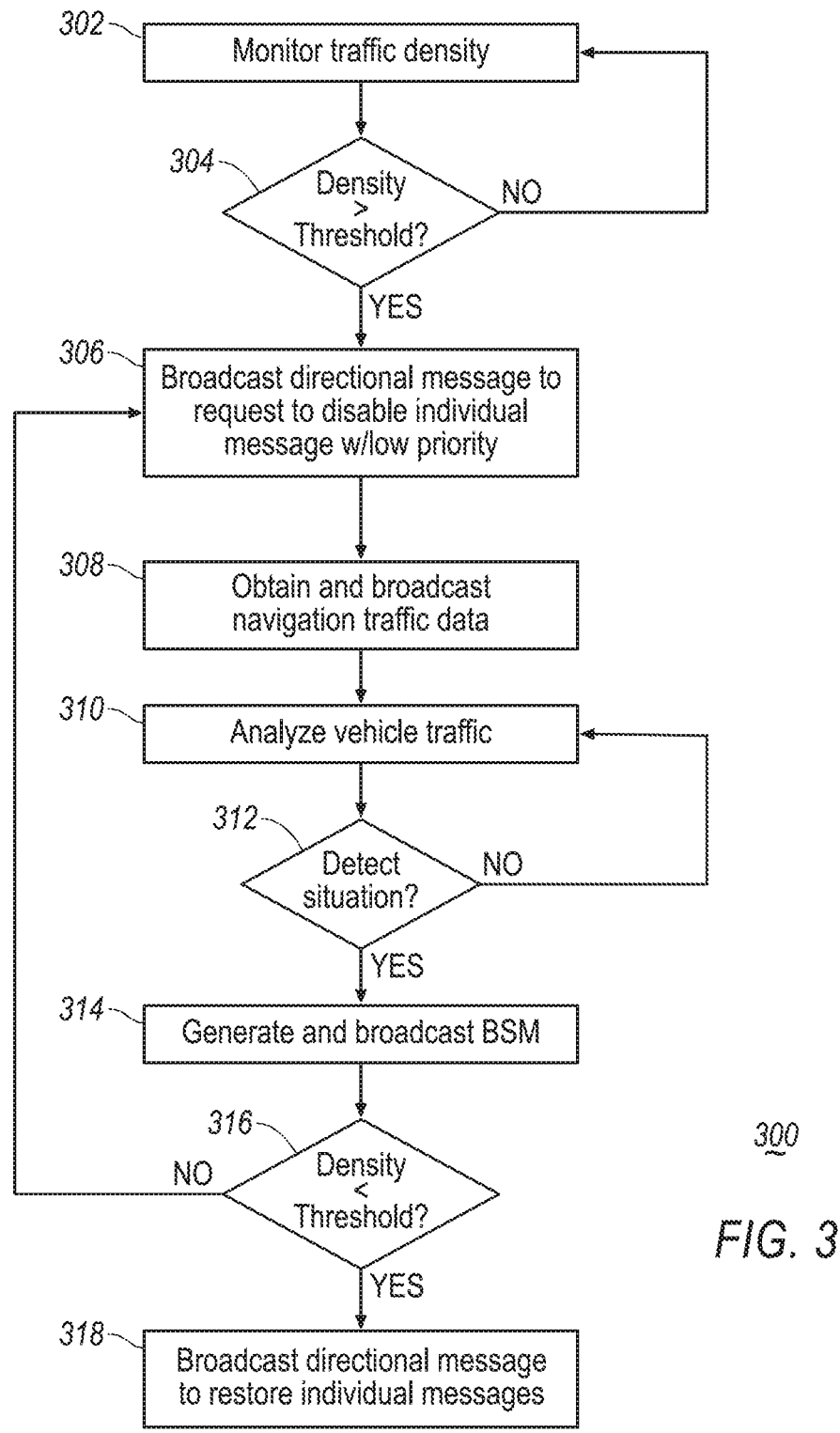
FIG. 3 illustrates an example flow diagram of a process for the edge computing device of one embodiment of the present disclosure.

FIG. 3 illustrates an example flow diagram for a process 300 perform by the MEC device 152 of one embodiment of the present disclosure. With continuing reference to FIGS. 1 and 2, at operation 302 the MEC device 152 monitors the traffic within the designated geofence 204 via the one or more cameras 174 and other sensors (not shown). The MEC device 152 may calculate and determine a traffic density based on the live traffic flow as monitored. At this stage, the collective broadcast feature of the MEC device 152 is disabled and each vehicle may send and receive messages individually. At operation 304, the MEC device 152 compares the traffic density with a predefined threshold to evaluate the radio congestion situation. The threshold may be defined and adjusted based on specific design need. Different MEC devices designated to different area may be assigned with different threshold. Alternatively, the MEC device 152 may be further configured to dynamically adjust the threshold based on factors such as time of the day, weather, wireless signals detected by the wireless transceiver 184, or the like. For instance, the MEC device 152 may reduce the threshold in bad weather conditions (e.g. rain, snow, fog) because the bad weather conditions may trigger more BSMs from each individual vehicle, increasing the chance of radio congestion. The weather conditions may be detected by the camera 174 or obtained via the cloud server 128. In case that the MEC device 152 primarily relies on cameras 174 to monitor traffic flow, the MEC collective messaging system may be disabled in weather conditions with low visibility (e.g. fog) to avoid mis-evaluation.

As a general rule, radio congestions are more likely to happen with the increasing number of vehicle traffic within the geofence 204. If the traffic density is not greater than the threshold, the process returns to operation 302 and the MEC device 152 continues to monitor the traffic flow. However, if the traffic density is greater than the threshold, the process proceeds to operation 306 and the MEC device 152 broadcast a directional message to fleet vehicles 102 within the geofence 204 to request the fleet vehicles 102 to disable the individual messaging for messages with low priority. Fleet vehicles 102 may be configured to support messaging services with a variety of priorities. For instance, medical emergency service messages may be assigned with the highest priority (i.e. priority "0") and must be sent out in any situations. The directional message from the MEC device 152 may not disable medical emergency service messages. BSMs and traffic data request messages may be assigned with a medium priority (i.e. priority "1") and disabled by each fleet vehicle 102 responsive to receiving the directional message. Vehicle service messages may be assigned with even a lower priority (i.e. priority "2") and put on hold by each fleet vehicle 102 until individual messaging services are restored.

At operation 308, the MEC device 152 obtains navigation traffic data from the cloud server 128 and broadcast the traffic data to fleet vehicles 102 within the geofence. The navigation traffic data may cover one or more area of road traffic near the geofence 204. Since the traffic data request message is with the medium priority that is disabled within the geofence, fleet vehicles 102 may obtain the traffic data collectively from the MEC device 152. At operation 310, the MEC device 152 analyze the vehicle traffic using image/video data capture by the cameras to determine traffic situations that require BSM communications. Responsive to detecting a traffic situation at operation 312, the process proceeds to operation 314 and the MEC device 152 generates a BSM reflecting the traffic situation as detected and broadcast the BSM to vehicles within the geofence 204. As an example, the traffic situation may include a fleet vehicle making a left turn, in which case BSMs may be generated to inform the vehicle intent to nearby vehicles 102. The MEC device 152 may detect the left turn intent of the vehicle by identifying features such as turn signal light, vehicle being located in left turn lane, vehicle maneuver or the like. In addition to detecting the intent of the fleet vehicle, since the MEC device 152 generates BSM based on camera/sensor data, a traffic situation initiated by a non-fleet vehicle without the wireless communication feature may also be detected by the MEC device 152. For instance, responsive to detecting an intent of a vehicle no matter with or without the wireless communication feature, the MEC device 152 may generate a BSM and broadcast within the geofence 204 to provide a solution with improved safety compared to conventional individual messaging services. At operation 316, the MEC device 152 verifies if the traffic density has reduced below the threshold. If the answer is a no indicating the traffic flow is still high, the process returns to operation 306.

Otherwise, the process proceeds to operation 318 and the MEC device broadcast a second directional message to the vehicles 102 within the geofence to restore individual messaging services.

Figure 4:
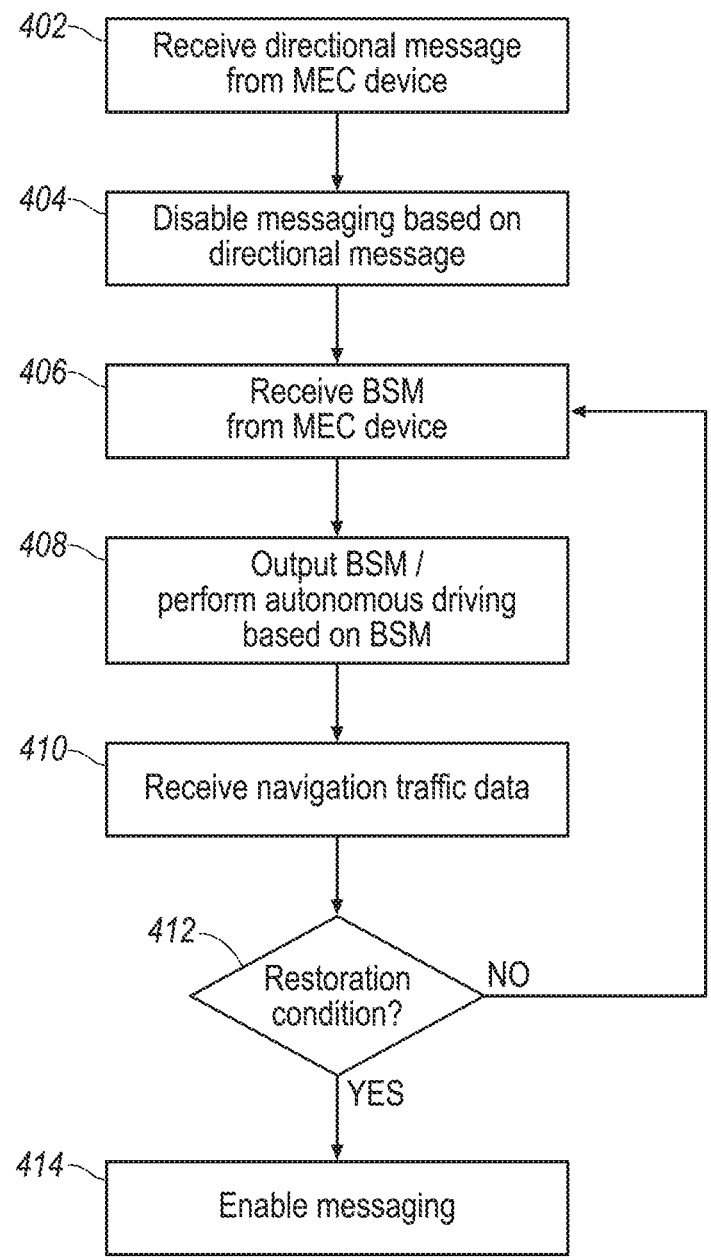
FIG. 4 illustrates an example flow diagram of a process for a vehicle of one embodiment of the present disclosure.

Referring to FIG. 4, an example flow diagram for a process 400 performed by a fleet vehicle 102 is illustrated. With continuing reference to FIGS. 1-3, at operation 402, the vehicle 102 receives a directional message from the MEC device 152 indicative of a request to disable low priority messaging services. The directional message may include various information, such as priority level for disabled messaging services, boundary of the geofence, and/or a timer (to be discussed in detail below). Responsive to receiving the direction message, at operation 404, the vehicle 102 disables messaging services with the priority level as instructed. Here, although the transmission of low priority messages may be temporarily disabled, the vehicle 102 may still generate low priority messages (e.g. service messages) and store the messages in the storage 110 for later transmissions. At operation 406, the vehicle 102 receives a BSM from the MEC device 152 and output the BSM via the HMI controls 112 at operation 408. Additionally or alternatively, in case that the vehicle 102 is provided with autonomous driving features enabled by the ADC 150, the vehicle 102 may direct the BSM to the ADC 150 for autonomous driving maneuvers. At operation 410, the vehicle 102 receives the navigation traffic data broadcasted from the MEC device 152. At operation 412, the vehicle 102 verifies if the individual messaging restoration condition has been met. The verification may be performed in various manners. As a few non-limiting examples, the vehicle 102 may receive a second directional message from the MEC device 152 indicative of a restoration of individual services. Additionally or alternatively, the vehicle 102 may verify if the location of the vehicle is still within the geofence 204 instructed in the directional message to decide whether to restore the individual messaging services. Additionally or alternatively, the directional message receive from the MEC device 152 may include a timer the expiration of which indicates permission to restore individual services. In case the vehicle stays in the geofence for extended period of time (e.g. in a traffic congestion), the MEC device 152 may be configured to repeats the directional message periodically to renew the timer so that to continue the collective messaging services. If the restoration condition is not met yet, the process returns to operation 406. Otherwise, the process proceeds to operation 414 and the vehicle 102 restore the individual messaging services. In case that the vehicle has generated low priority messages (e.g. service messages) during the collective messaging mode, the vehicle 102 may send the messages out responsive to restoration of the service.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computing device, comprising:
   a camera configured to capture images of an area of a road, the area defining a geofence; and
   a processor, configured to responsive to detecting a traffic density within the geofence exceeding a predefined threshold, wirelessly broadcast a directional message within the geofence to request vehicles located within the geofence to temporarily disable individual messaging services having low priorities identified in the directional message, analyze vehicle traffic using images captured by the camera to detect a predefined traffic situation, responsive to detecting the predefined traffic situation initiated by one of the vehicles, generate a safety message reflecting the traffic situation, and broadcast the safety message to vehicles within the geofence.

2. The computing device of claim 1, wherein the processor is further configured to adjust the predefined threshold using a weather condition of the geofence.

3. The computing device of claim 2, wherein the processor is further configured to obtain the weather condition from a cloud server.

4. The computing device of claim 1, wherein the processor is further configured to:

obtain navigation traffic data for a predefined area of road connected to the geofence from a cloud server; and broadcast the navigation traffic data to the vehicles within the geofence.

5. The computing device of claim 1, wherein the processor is further configured to:

responsive to detecting the traffic density is below the predefined threshold, broadcast an instruction message requesting the vehicles within the geofence to restore individual messaging services.

6. The computing device of claim 1, wherein the directional message includes information indicative of a boundary of the geofence.

7. The computing device of claim 1, wherein the directional message includes a timer indicative of the duration for the vehicles to disable the individual messaging services.

8. The computing device of claim 7, wherein the processor is further configured to:

broadcast a second directional message to the vehicles within the geofence before the timer expires to renew the timer.

9. A vehicle, comprising:

a wireless transceiver; and a controller configured to responsive to receiving a directional message, via the wireless transceiver, broadcasted from an edge-computing device, activate a collective messaging mode by disabling individual messaging services having predefined low priorities identified in the directional message, responsive to receiving a safety message broadcasted from the edge-computing device, perform an autonomous driving maneuver using the safety message, and responsive to detecting a restoration condition being met, deactivate the collective messaging mode by restoring the individual messaging services.

10. The vehicle of claim 9, wherein the controller is further configured to:

responsive to receiving traffic data broadcasted from the edge-computing device, plan a navigation route using the traffic data.

11. The vehicle of claim 9, wherein the restoration condition is met by the vehicle receiving an instruction message from the edge-computing device.

12. The vehicle of claim 9, further comprising:

a location controller configured to calculate a vehicle location, wherein directional message includes information about a geofence within which the individual messaging services to be disabled, and the restoration condition is met by the controller verifying the vehicle location is outside the geofence.

13. The vehicle of claim 9, wherein the directional message includes a timer indicative of a duration to disable the individual messaging services, the restoration condition is met by the controller verifying an expiration of the timer.

14. The vehicle of claim 13, wherein the controller is further configured to:

responsive to receiving a second directional message from the edge-computing device, renew the timer to continue to disable the individual messaging services.

15. The vehicle of claim 9, wherein the controller is further configured to:

in the collective messaging mode, refrain from generating a basic safety messaging having a first priority within the low priorities identified in the directional message, generate a service message having a second low priority within the low priorities identified in the directional message, and refrain from sending the service message, until the collective messaging mode is deactivated.

16. A method, comprising:

capturing, via a camera, images covering an area of a road;

analyzing, via a processor, the images to evaluate a traffic density in the area;

responsive to detecting the traffic density exceeding a predefined threshold, broadcasting, via a wireless transceiver, a directional message within the area to request vehicles located within the area to temporarily disable individual messaging services having low priorities identified in the directional message;

responsive to detecting a predefined traffic situation initiated by one of the vehicles, generating, via the processor, a safety message reflecting the traffic situation;

broadcasting, via the wireless transceiver, the safety message to vehicles within the area; and responsive to detecting the traffic density is below the predefined threshold, broadcasting an instruction message requesting the vehicles within the area to restore individual messaging services.

17. The method of claim 16, further comprising:

obtaining, via a wired connection, navigation traffic data for road traffic adjacent to the area from a cloud server; and broadcasting, via the wireless transceiver, the navigation traffic data to the vehicles within the area.

18. The method of claim 16, further comprising adjusting the predefined threshold using a weather condition of the area obtained from a cloud server.

19. The method of claim 16, wherein the directional message includes information indicative of a boundary of the area.

20. The method of claim 16, wherein the directional message includes a timer indicative of a duration for the vehicles to disable the individual messaging services, the method further comprising broadcasting, via the wireless transceiver, a second directional message to the vehicles within the area before the timer expires to renew the timer.

\* \* \* \* \*